US010645449B2

(12) United States Patent
Tan

(10) Patent No.: US 10,645,449 B2
(45) Date of Patent: May 5, 2020

(54) METHOD AND APPARATUS OF CONTENT-BASED SELF-ADAPTIVE VIDEO TRANSCODING

(71) Applicant: Alibaba Group Holding Limited, Grand Cayman (KY)

(72) Inventor: Jianguo Tan, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 618 days.

(21) Appl. No.: 14/722,828

(22) Filed: May 27, 2015

(65) Prior Publication Data

US 2015/0350726 A1 Dec. 3, 2015

(30) Foreign Application Priority Data

May 30, 2014 (CN) .......................... 2014 1 0240464

(51) Int. Cl.
*H04N 7/12* (2006.01)
*H04N 21/4402* (2011.01)
(Continued)

(52) U.S. Cl.
CPC ... *H04N 21/440218* (2013.01); *H04N 7/0102* (2013.01); *H04N 7/0122* (2013.01);
(Continued)

(58) Field of Classification Search
CPC ......... H04N 19/124; H04N 21/440254; H04N 21/440218; H04N 7/0127; H04N 7/0122;
(Continued)

(56) References Cited

U.S. PATENT DOCUMENTS 8,189,677 B2 * 5/2012 Auyeung ............. H04N 19/176
375/240.01
8,290,038 B1 * 10/2012 Wang ................... H04N 19/139
375/240.02
(Continued)

FOREIGN PATENT DOCUMENTS

CN 1668109 A 9/2005
CN 101404767 A 4/2009
(Continued)

OTHER PUBLICATIONS

PCT Search Report and Written Opinion dated Aug. 25, 2015 for PCT application No. PCT/US15/32613. 9 pages.
(Continued)

*Primary Examiner* — Jayanti K Patel
*Assistant Examiner* — Richard Carter
(74) *Attorney, Agent, or Firm* — Lee & Hayes, P.C.

(57) ABSTRACT

A method of content-based self-adaptive video transcoding, which includes: acquiring a minimum quantized value representative of a content complexity of a video to be transcoded and satisfying a preset objective quality standard; setting a value of transcoding parameter based on the minimum quantized value representative of the content complexity of the video to be transcoded and a video parameter value of the video to be transcoded; and transcoding the video to be transcoded based on the set transcoding parameter to generate a target video. The present disclosure further provides an apparatus of content-based self-adaptive video transcoding. The method provided by the present disclosure can avoid unnecessarily bandwidth consumption while ensuring the quality of the transcoded video.

20 Claims, 6 Drawing Sheets

(51) Int. Cl.
   *H04N 19/14*    (2014.01)
   *H04N 19/124*   (2014.01)
   *H04N 19/136*   (2014.01)
   *H04N 19/172*   (2014.01)
   *H04N 19/40*    (2014.01)
   *H04N 7/01*     (2006.01)

(52) U.S. Cl.
   CPC ......... *H04N 7/0127* (2013.01); *H04N 19/124* (2014.11); *H04N 19/136* (2014.11); *H04N 19/14* (2014.11); *H04N 19/172* (2014.11); *H04N 19/40* (2014.11); *H04N 21/440254* (2013.01); *H04N 21/44029* (2013.01); *H04N 21/440272* (2013.01)

(58) Field of Classification Search
   CPC .... H04N 7/0102; H04N 19/40; H04N 19/172; H04N 19/136; H04N 21/440272; H04N 21/44029
   USPC ............................. 375/240.01–240.03, 240.08
   See application file for complete search history.

(56) References Cited

U.S. PATENT DOCUMENTS

| | | |
|---|---|---|
| 2004/0081236 A1 | 4/2004 | Seo |
| 2005/0002454 A1* | 1/2005 | Ueno ................... H04N 19/176 375/240.03 |
| 2005/0232497 A1 | 10/2005 | Yogeshwar et al. |
| 2006/0198392 A1 | 9/2006 | Park et al. |
| 2007/0230568 A1* | 10/2007 | Eleftheriadis .......... H04N 19/46 375/240.1 |
| 2007/0263720 A1* | 11/2007 | He ....................... H04N 19/124 375/240.03 |
| 2008/0112483 A1 | 5/2008 | Lu et al. |
| 2008/0232459 A1* | 9/2008 | Auyeung ............... H04N 19/147 375/240.01 |
| 2009/0196348 A1* | 8/2009 | Masterson ............ G06F 17/145 375/240.03 |
| 2009/0288129 A1 | 11/2009 | Wolfe et al. |
| 2013/0287098 A1 | 10/2013 | Johar et al. |
| 2014/0036993 A1 | 2/2014 | Bae |
| 2016/0007050 A1* | 1/2016 | Rusert .................... H04N 19/56 375/240.08 |

FOREIGN PATENT DOCUMENTS

| | | |
|---|---|---|
| CN | 101888542 A | 11/2010 |
| CN | 101998117 A | 3/2011 |
| CN | 102055966 A | 5/2011 |
| CN | 103414915 A | 11/2013 |
| CN | 103503462 A | 1/2014 |

OTHER PUBLICATIONS

Machine translation of second Chinese Office Action dated May 25, 2018, for Chinese patent applicaiton No. 201410240464.X, a counterpart foreign application of U.S. Appl. No. 14/722,828, 5 pages.

Machine translation of first Chinese Office Action dated Oct. 26, 2017, for Chinese patent application No. 201410240464.X, a counterpart foreign application of U.S. Appl. No. 14/722,828, 7 pages.

Chinese Search Report dated Oct. 17, 2017, for Chinese patent application No. 201410240464.X, 2 pages.

* cited by examiner

METHOD AND APPARATUS OF CONTENT-BASED SELF-ADAPTIVE VIDEO TRANSCODING

CROSS REFERENCE TO RELATED PATENT APPLICATION

This application claims foreign priority to Chinese Patent Application No. 201410240464.X filed on May 30, 2014, entitled "Method and Apparatus of Content-Based Self-Adaptive Video Transcoding", which is hereby incorporated by reference in its entirety.

TECHNICAL FIELD

The present disclosure relates to a video transcoding technology, and in particular, to methods of content-based self-adaptive video transcoding. The present disclosure further provides apparatuses of content-based self-adaptive video transcoding.

BACKGROUND

With the rapid development of information technology, the use of multimedia technology in a network has undergone an unprecedented development. Video communications technology, as an important part of the multimedia technology, has also developed vigorously and has been widely used. Since different videos may adopt different encoding or compression standards and specific application scenarios may also be different, an operation of video transcoding is often desirable when video files are shared, exchanged or played among different devices.

Video Transcoding refers to converting a compressed and encoded video bit stream into another video bit stream to adapt for a different bandwidth, a different terminal processing capability, and a different user requirement. In essence, transcoding is a process of decoding and then encoding, and such process may involve conversion between different video formats, for example, converting from MPEG-2 or MPEG-4 to H.264, and may further involve adjustments of transcoding parameters such as, a bit rate, a resolution and a frame rate, etc., so that a video that is generated after the transcoding operation can satisfy particular requirements. Examples include a reduction in a bit rate of encoding to adapt to a transmission scenario with a limited network bandwidth or a requirement on a playing speed of a terminal device, or an adjustment of an encoding resolution to convert a high definition video into a video with a standard definition or even a lower definition to reduce a space of storage media that is occupied by an associated video file.

Currently, a number of video enterprises have offered video transcoding tools. These video transcoding tools generally adopt traditional video transcoding technology, i.e., using preset video transcoding parameters (a resolution, a bit rate or a frame rate) for transcoding. Examples include using a fixed bit rate corresponding to a resolution of a video to be transcoded to perform a transcoding, or fixing a width of a video image, setting a height based on as aspect ratio, adjusting a bit rate according to a number of pixels and performing the transcoding.

As can be seen, the traditional video transcoding technology does not consider the complexity of video content to be transcoded and basically sets parameter values for video transcoding based on subjective experience, or merely considers one or more parameters of the video to be transcoded. As a result, the traditional video transcoding technology often cannot achieve effective transcoding of video files with different contents. For example, a waste of network bandwidth may result because of a higher bit rate used for encoding for a video having relatively simple content; and a deterioration in an overall definition of a video with complicated content may result after transcoding due to the use of a lower resolution for the video.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method for content-based self-adaptive video transcoding to solve the problem of wasting a network bandwidth and affecting the quality of an outputted video due to the use of fixed transcoding parameters in existing video transcoding technologies for transcoding. The present disclosure further provides an apparatus for content-based self-adaptive video transcoding.

The present disclosure provides a method for content-based self-adaptive video transcoding, which includes:

acquiring a minimum quantized value that is representative of a content complexity of a video to be transcoded and satisfies a preset objective quality standard;

setting a transcoding parameter value based on the minimum quantized value that is representative of the content complexity of the video to be transcoded and a video parameter value of the video to be transcoded; and transcoding the video to be transcoded based on the set transcoding parameter to generate a target video.

Optionally, the transcoding parameter includes a bit rate parameter, a resolution parameter and a frame rate parameter.

Optionally, prior to acquiring the minimum quantized value that is representative of the content complexity of the video to be transcoded and satisfies the preset objective quality standard, the following procedure is performed:

acquiring values of video parameters of the video to be transcoded, the video parameters including a resolution parameter and a frame rate parameter.

Optionally, the preset objective quality standard corresponds to a peak signal-to-noise ratio (PSNR) being higher than or equal to 40 dB.

Optionally, acquiring the minimum quantized value that is representative of the content complexity of the video to be transcoded and satisfies the preset objective quality standard includes:

building a linear model for a quantization parameter (QP) and a peak signal-to-noise ratio (PSNR) for the video to be transcoded;

acquiring a maximum value of the quantization parameter (QP) when the peak signal-to-noise ratio (PSNR) is higher than or equals to 40 dB based on the linear model; and transcoding the video to be transcoded based on the maximum value of the quantization parameter (QP), and acquiring a minimum value for a bit rate corresponding to the maximum value of quantization parameter (QP), the minimum value of the bit rate being the minimum quantized value that is representative of the content complexity of the video to be transcoded and satisfies the preset objective quality standard.

Optionally, building the linear model of the quantization parameter (QP) and a peak signal-to-noise ratio (PSNR) for the video to be transcoded is implemented by:

truncating one or more video clips in the video to be transcoded, and building the linear model of the quantization parameter (QP) and the peak signal-to-noise ratio (PSNR) based on the one or more video clips.

Optionally, setting the transcoding parameter value based on the minimum quantized value that is representative of the content complexity of the video to be transcoded and the video parameter value of the video to be transcoded corresponds to:

setting a parameter value of a bit rate in the transcoding parameter as a minimum value of the bit rate, setting a resolution parameter value in the transcoding parameter as an acquired resolution value of the video to be transcoded, and setting a frame rate parameter value in the transcoding parameter as an acquired frame rate value of the video to be transcoded.

Optionally, setting the transcoding parameter value based on the minimum quantized value that is representative of the content complexity of the video to be transcoded and the video parameter value of the video to be transcoded includes:

acquiring a video type of the video to be transcoded based on a minimum value of a bit rate according to a preset specification;

selecting one or more target video types based on the video type of the video to be transcoded according to the preset specification; and setting a corresponding transcoding parameter value for each target video type.

Optionally, the video type includes a LD bit stream, a SD bit stream, a HD bit stream, an UD bit stream or an UUD bit stream.

Optionally, in response to acquiring the video type of the video to be transcoded based on the minimum value of the bit rate, the video type of the video to be transcoded is modified by:

acquiring a minimum value of a resolution corresponding to the video type of the video to be transcoded, according to the preset specification;

determining whether an acquired resolution parameter value of the video to be transcoded is lower than the minimum value; and using a video type corresponding to the acquired resolution parameter value of the video to be transcoded as the video type of the video to be transcoded if affirmative.

Optionally, setting the corresponding transcoding parameter value for each target video type includes:

building a linear model of the resolution and the bit rate for the video to be transcoded based on the minimum value of the bit rate and the acquired resolution parameter value of the video to be transcoded;

for each target video type, setting a transcoding parameter value corresponding to the target video type by:

selecting an intermediate bit rate value between a maximum value and the minimum value of the bit rate corresponding to a current target video type according to the preset specification, and setting a bit rate parameter value in the transcoding parameter as the intermediate bit rate value;

acquiring a resolution value corresponding to the intermediate bit rate value based on the built linear model of the resolution and the bit rate, and setting a resolution parameter value in the transcoding parameter as the resolution value; and setting a frame rate parameter value in the transcoding parameter as an acquired frame rate value of the video to be transcoded.

Optionally, after acquiring the resolution value corresponding to the intermediate bit rate value based on the built linear model of the resolution and the bit rate, the following operation is performed:

multiplying a width and a height of the acquired resolution value by a same preset adjustment factor respectively, and using an obtained resolution value as the resolution value used for setting the resolution parameter in the transcoding parameter.

Optionally, setting the transcoding parameter value for each target video type includes:

acquiring a minimum value of the resolution corresponding to the current target video type according to the preset specification;

determining whether the resolution value corresponding to the intermediate bit rate value is lower than the minimum value of the resolution; and using the minimum value of the resolution as the resolution value used for setting the resolution parameter in the transcoding parameter if affirmative.

Optionally, transcoding the video to be transcoded based on the set transcoding parameter corresponds to:

for each target video type, transcoding the video to be transcoded using the bit rate parameter, the resolution parameter and the frame rate parameter that are set and correspond to the target video type.

Correspondingly, the present disclosure further provides an apparatus for content-based self-adaptive video transcoding, which includes:

a quantized value acquisition unit to acquire a minimum quantized value representative of a content complexity of a video to be transcoded and satisfying a preset objective quality standard;

a transcoding parameter setting unit to set a transcoding parameter value based on the minimum quantized value representative of the content complexity of the video to be transcoded and a video parameter value of the video to be transcoded; and a video transcoding unit to transcode the video to be transcoded based on the set transcoding parameter and to generate a target video.

Optionally, the apparatus further includes:

a video parameter acquisition unit to acquire values of video parameters of the video to be transcoded prior to acquiring the minimum quantized value representative of the content complexity of the video to be transcoded and satisfying the preset objective quality standard, the video parameters including a resolution parameter and a frame rate parameter.

Optionally, the quantized value acquisition unit includes:

a first model building subunit to build a linear model of a quantization parameter (QP) and a peak signal-to-noise ratio (PSNR) for the video to be transcoded;

a quantization parameter acquisition subunit to acquire a maximum value of the quantization parameter (QP) when the peak signal-to-noise ratio (PSNR) is higher than or equals to 40 dB based on the linear model;

a minimum bit rate acquisition subunit to transcode the video to be transcoded based on the maximum value of the quantization parameter (QP), and to acquire a minimum value of a bit rate corresponding to the maximum value of the quantization parameter (QP), the minimum value of the bit rate being the minimum quantized value representative of the content complexity of the video to be transcoded and satisfying the preset objective quality standard.

Optionally, the first model building subunit is used for truncating one or more video clips in the video to be transcoded, and building the linear model of the quantization parameter (QP) and the peak signal-to-noise ratio (PSNR) based on the one or more video clips.

Optionally, the transcoding parameter setting unit is used for setting a bit rate parameter value in the transcoding parameter as the minimum value of the bit rate, setting a resolution parameter value in the transcoding parameter as an acquired resolution value of the video to be transcoded, and setting a frame rate parameter value in the transcoding parameter as an acquired frame rate value of the video to be transcoded.

Optionally, the transcoding parameter setting unit includes:

an original video type acquisition subunit to acquire a video type of the video to be transcoded based on the minimum value of the bit rate and a preset specification;

a target video type acquisition subunit to select one or more target video types based on the video type of the video to be transcoded and the preset specification; and a transcoding parameter setting subunit to set a corresponding transcoding parameter value for each target video type.

Optionally, the transcoding parameter setting unit further includes:

an original video type modification subunit to modify the video type of the video to be transcoded after acquiring the video type of the video to be transcoded based on the minimum value of the bit rate.

The original video type modification subunit includes:

a first minimum resolution acquisition subunit to acquire a minimum value of a resolution corresponding to the video type of the video to be transcoded based on the preset specification;

a first minimum resolution determination subunit to determine whether an acquired resolution parameter value of the video to be transcoded is lower than the minimum value; and an original video type adjustment subunit to take a video type corresponding to the acquired resolution parameter value of the video to be transcoded as the video type of the video to be transcoded when an output of the first minimum resolution judgment subunit is affirmative.

Optionally, the transcoding parameter setting subunit includes:

a second model building subunit to build a linear model of the resolution and the bit rate for the video to be transcoded based on the minimum value of the bit rate and the acquired resolution parameter value of the video to be transcoded;

a transcoding parameter setting control subunit to set the transcoding parameter for each target video type by sequentially invoking a bit rate parameter setting subunit, a resolution parameter setting subunit and a frame rate parameter setting subunit;

the bit rate parameter setting subunit to select an intermediate bit rate value between a maximum value and the minimum value of the bit rate corresponding to the current target video type according to the preset specification, and set a bit rate parameter value in the transcoding parameter as the intermediate bit rate value;

the resolution parameter setting subunit to acquire a resolution value corresponding to the intermediate bit rate value based on the built linear model of the resolution and the bit rate, and set a resolution parameter value in the transcoding parameter as the resolution value; and the frame rate setting subunit to set a frame rate parameter value in the transcoding parameter as an acquired frame rate value of the video to be transcoded.

Optionally, the resolution parameter setting subunit includes:

a resolution parameter acquisition subunit to acquire the resolution value corresponding to the intermediate bit rate value based on the built linear model of the resolution and the bit rate;

a resolution parameter adjustment subunit to multiply a width and a height of the resolution value outputted by the resolution parameter acquisition subunit by a same preset adjustment factor respectively; and a first resolution parameter setting subunit to set the resolution parameter value in the transcoding parameter as an adjusted resolution value outputted by the resolution parameter adjustment subunit.

Optionally, the resolution parameter setting subunit includes:

a resolution parameter acquisition subunit to acquire the resolution value corresponding to the intermediate bit rate value based on the built linear model of the resolution and the bit rate;

a second minimum resolution acquisition subunit to acquire a minimum value of a resolution corresponding to the current target video type according to the preset specification;

a second minimum resolution determination subunit to determine whether the resolution value corresponding to the intermediate bit rate value is lower than the minimum value of the resolution; and a second resolution parameter setting subunit to set the resolution parameter value in the transcoding parameter as the minimum value of the resolution when an output of the second minimum resolution judgment subunit is affirmative.

Optionally, the video transcoding unit is used to, for each target video type, transcode the video to be transcoded using the bit rate parameter, the resolution parameter, and the frame rate parameter that are set and correspond to the target video type to acquire a corresponding target video.

Compared with the existing technologies, the present disclosure has the following advantages:

The method for content-based self-adaptive video transcoding provided by the present disclosure, by acquiring a minimum quantized value representative of a content complexity of a video to be transcoded and satisfying a preset objective quality standard, sets each transcoding parameter value needed for transcoding based on the minimum quantized value, and transcodes the video to be transcoded based on the set transcoding parameter, thereby achieving a self-adaptive setting of a resolution parameter and a bit rate parameter needed for transcoding based on an amount of information of the video to be transcoded under a precondition of reaching an objective image quality standard, and thus avoiding an unnecessary consumption of bandwidth while guaranteeing the quality of the transcoded video.

BRIEF DESCRIPTION OF THE DORIGINALINGS

DETAILED DESCRIPTION

Specific details are described herein to facilitate the understanding of the present disclosure. Nevertheless, the present disclosure can be implemented in many different ways other than those described herein. One skilled in the art can make similar improvements without departing from the content of the present disclosure. Accordingly, the present disclosure is not limited to the embodiments disclosed herein.

The present disclosure provides a method of content-based self-adaptive video transcoding and an apparatus of content-based self-adaptive video transcoding respectively, which will be described in detail in the following embodiments.

Figure 1:
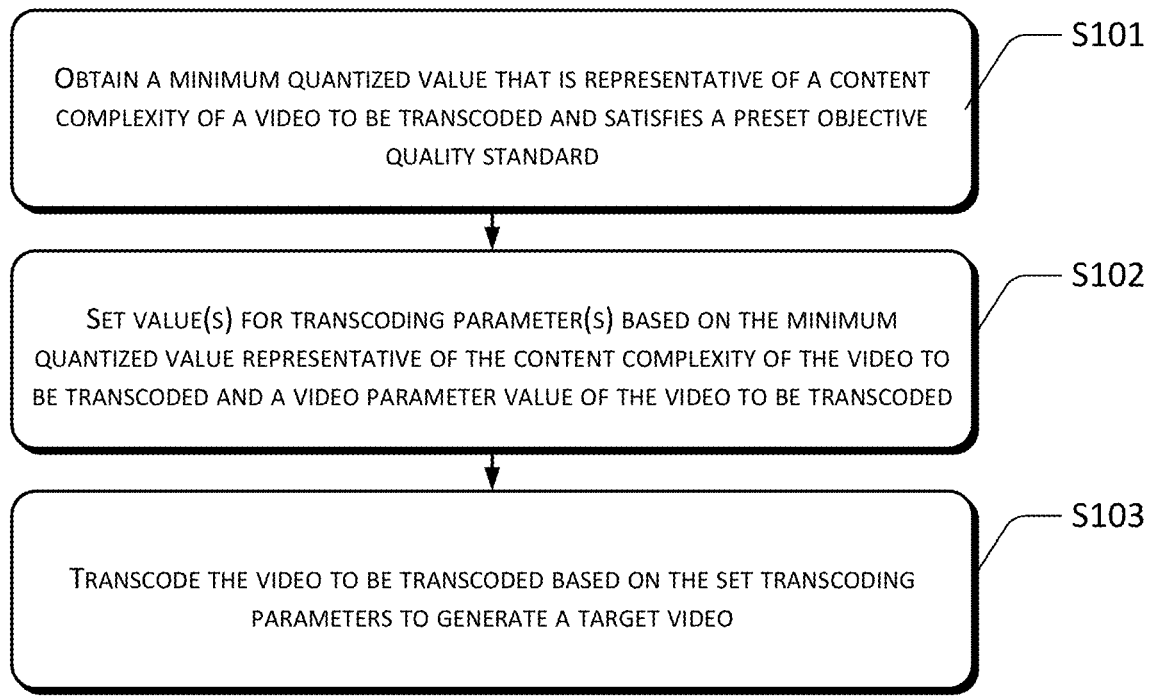
FIG. 1 is a flowchart of an example method of content-based self-adaptive video transcoding according to the present disclosure.

FIG. 1 shows a flowchart of an example method of content-based self-adaptive video transcoding according to the present disclosure. The method includes method blocks as follows:

Block S101 obtains a minimum quantized value that is representative of a content complexity of a video to be transcoded and satisfies a preset objective quality standard.

In general, a transcoding process includes two parts: decoding and encoding. The phase of encoding performs a conversion between encoding formats according to a requirement on one hand, and designates parameters, such as a bit rate, a resolution, a frame rate, for target video data to be transcoded according to a transcoding objective to generate a target video satisfying the requirement on the other hand. A technical solution of the present disclosure involves setting up transcoding parameter(s). Other processing, such as decoding and encoding format conversion, may be implemented using the existing technologies, for example, by invoking related interfaces provided in a FFMPEG library.

The core of the technical solution of the present disclosure is to set up transcoding parameter(s) based on a minimum quantized value that is representative of a content complexity (i.e., an amount of information of a video to be transcoded) of the video to be transcoded and satisfies a preset objective quality standard, thereby avoiding unnecessary consumption of a bandwidth while guaranteeing the quality of the transcoded video.

The technical solution of the present disclosure can provide one or more levels of online video sources to users, which not only guarantees the quality of an online video, but also reduces the bandwidth for an overall video service. However, the technical solution of the present disclosure is not limited to such application. The technical solution of the present disclosure is applicable to any application scenario in which transcoding parameter(s) is/are set based on an amount of information of a video to be transcoded to perform a transcoding operation.

Figure 2:
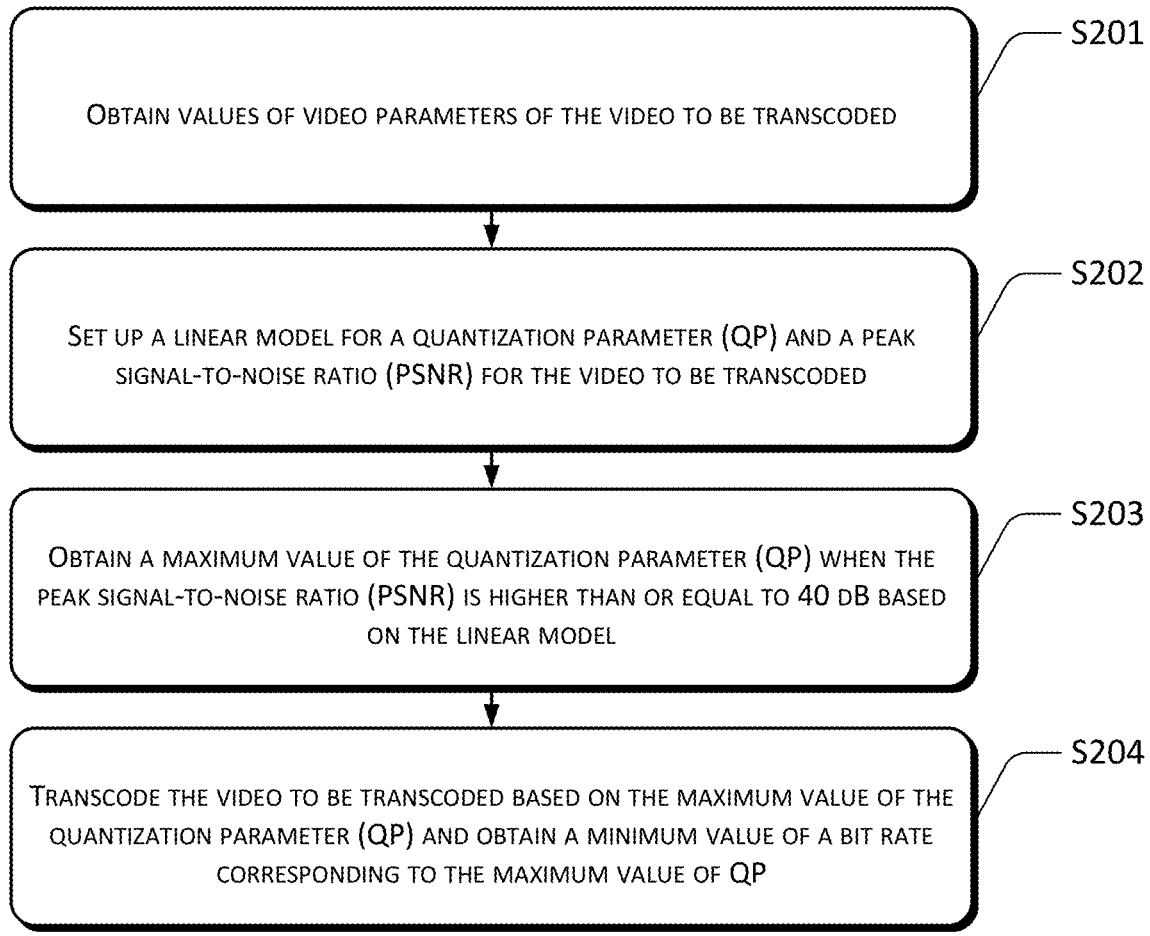
FIG. 2 is a flowchart of acquiring a minimum quantized value that is representative of a content complexity of a video to be transcoded and satisfies a preset objective quality standard according to the present disclosure.

In order to implement the technical solution of the present disclosure, a minimum quantized value representative of a content complexity of a video to be transcoded and satisfying a preset objective quality standard is acquired first. Details of an associated process include acquiring video parameter value(s) of the video to be transcoded, building model(s), acquiring a maximum value of a quantization parameter (QP), and acquiring a minimum value of a bit rate corresponding to the maximum value of the quantization parameter (QP). These method blocks are described hereinafter with reference to FIG. 2.

Block S201 obtains values of video parameters of the video to be transcoded, the video parameters including a resolution parameter and a frame rate parameter.

The values of the video parameters of the video to be transcoded may be obtained by reading and analyzing a format of the video file to be transcoded, or by using a probe tool ffprobe that is provided by FFMPEG (an English abbreviation of Fast Forward MPEG) open source codes and used for viewing audio/video file information.

FFMPEG is an encoding/decoding software library that is most widely used nowadays, and supports a plurality of prevailing codecs. FFMPEG is implemented in C Language, which is not only integrated with various PC software, but also transplanted into various embedded apparatuses in many cases. Using FFMPEG library can not only perform encoding/decoding of audio/video through a command line, but also implement desirable functions via an invocation of an Encode/Decode function API provided by the library in the codes.

In response to invoking a ffprobe command provided in the FFMPEG library based on a format described as follows, video parameter information of a video to be transcoded will be outputted on a screen, which includes parameters such as a resolution (res), a frame rate (fps), etc.

ffprobe-show_streams "video file to be transcoded";

A resolution (where res is an English abbreviation of resolution) corresponds to a width/height pixel value of a video, i.e., valid pixels of a video image in horizontal and vertical directions. For video playback windows having a same size, a definition of an image is generally higher as a resolution is higher. A frame rate (where fps is an English abbreviation of frames per second) corresponds to a number of image frames that is filled in every second (with unit being frames/second), which is also referred to as frames per second. Generally, a video viewed by a user is smoother when a frame rate value is higher.

Block S202 sets up a linear model for a quantization parameter (QP) and a peak signal-to-noise ratio (PSNR) for the video to be transcoded.

The QP is an English abbreviation of the quantization parameter, and is a quantization parameter used for quantizing acquired DCT coefficient(s) in a video encoding process after deciding that a direct factor for a number of bits of an output bit rate is DCT Transform (Discrete Cosine Transform).

The quantization parameter (QP) reflects a compression condition of spatial details. If the quantization parameter is small, most details are reserved, and an output bit rate is higher. If the quantization parameter is large, some details are dropped, and an output bit rate is comparatively reduced. However, an image thereof has a more severe distortion and a lower quality. As can be seen, the quantization parameter (QP) is inversely proportional to the output bit rate. A basic method of controlling a bit rate in a transcoding process is to select a suitable quantization parameter to control a bit rate of a bit stream that is outputted by a transcoder.

The bit rate as mentioned above corresponds to an amount of data flow in every second. As the bit rate is higher, an associated image is more precise, the loss of the quality is less, and the acquired image is closer to an original image. However, a larger storage space or a higher network bandwidth is needed for storage and transmission of such data.

The present embodiment adopts PSNR (where PSNR is an English abbreviation of Peak Signal to Noise Ratio) to evaluate the quality of a video image. Generally, after processing such as transcoding or video compression, an output video image is different from an original video image to a certain extent. In order to objectively evaluate the quality of the processed video, a PSNR value is generally used as a reference. The PSNR value is calculated from a mean squared error (MSE) between the original video image and the processed video image, with a unit of dB. A higher PSNR value represents a less distortion.

The reason why a model of the QP and the PSNR is built at this method block is to determine a corresponding value of the QP based on the value of the PSNR in subsequent method blocks and to further determine a corresponding value for the bit rate.

Figure 3:
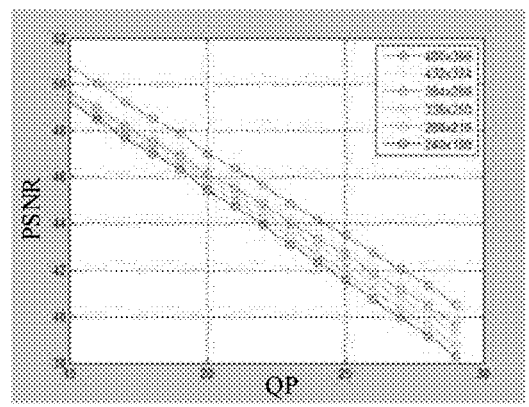
FIG. 3 is a schematic diagram of a peak signal-to-noise ratio (PSNR) and a quantization parameter (QP) that satisfy a near-linear relationship acquired by experiments according to the present disclosure.

Generally, the PSNR and the QP satisfy a near-linear relationship under a circumstance that other video parameters are fixed. FIG. 3 is a schematic diagram illustrating a PSNR and a QP satisfying a near-linear relationship that is acquired by experiments according to the present disclosure. In an implementation, a linear model therebetween is built based on the foregoing experiments by the following approach:

upon selecting other parameter factors (including a resolution, a frame rate, etc.) of the video to be transcoded, setting a value of the quantization parameter QP1, using a transcoding tool provided by FFMPEG to perform a transcoding operation, and acquiring an average PSNR1 of a video outputted after transcoding based on related information that is outputted in the screen; and further setting a value of the quantization parameter QP2 which is different from QP1 to perform the transcoding operation, and acquiring a corresponding average PSNR2 of a video output after transcoding. Since the PSNR and the QP satisfy a near-linear relationship, a linear model is obtained by connecting the acquired two points (QP1, PSNR1) and (QP2, PSNR2) to form a straight line.

In a real implementation, from the perspective of improving a time performance, one or more video clips in the video to be transcoded may be truncated, and a linear model of the quantization parameter (QP) and the peak signal-to-noise ratio (PSNR) may be built based on the one or more video clips using the above method. Since a total duration of the one or more truncated video clips is shorter than that of the video to be transcoded, a processing speed can be enhanced, thereby obtaining a better time performance. However, since the one or more truncated video clips may not be able to reflect characteristics of the entire video accurately, the model that is built therefrom may not be accurate sufficiently, which may affect a final transcoding result. Therefore, during the real implementation, a suitable implementation is selected carefully according to an actual need.

Block S203 obtains a maximum value of the quantization parameter (QP) when the peak signal-to-noise ratio (PSNR) is higher than or equal to 40 dB based on the linear model.

A precondition for performing video transcoding is to ensure that a target video generated after the transcoding satisfies a certain objective quality standard. In an event that the quality of transcoded video images is evaluated using PSNRs, a PSNR higher than or equal to 40 dB generally represents an excellent image quality, i.e., very close to an original image. A PSNR between 30 dB and 40 dB often indicates that the image quality is good, i.e., having a distortion that is perceivable but acceptable. A PSNR lower than 30 dB usually indicates that the image quality is rather poor. Therefore, if the PSNR is used for evaluating the image quality, a preset objective quality standard mentioned in the present disclosure corresponds to the peak signal-to-noise ratio (PSNR) being higher than or equal to 40 dB.

The embodiment uses a condition that the PSNR is higher than or equal to 40 dB as the objective quality standard for evaluating the quality of the transcoded video image. Under such condition, a maximum value, QP_max, of the quantization parameter may be selected based on the linear model built at block S202.

The embodiment adopts the PSNR as the objective standard for evaluating the quality of the processed video. In other implementations, other evaluation standards may also be used, e.g., SSIM (an English abbreviation of structural similarity index measurement) standard. Similarly, a model of the SSIM and the QP may be built at S202, and a corresponding QP_max may be acquired at this method block, which similarly achieves the technical solution of the present disclosure.

Block S204 transcodes the video to be transcoded based on the maximum value of the quantization parameter (QP), and obtains a minimum value of a bit rate corresponding to the maximum value of QP, the minimum value of the bit rate being the minimum quantized value representative of the content complexity of the video to be transcoded and satisfying the preset objective quality standard.

The core of the technical solution of the present disclosure is to determine a transcoding parameter based on a content complexity (that is, an amount of information that is included) of the video to be transcoded. In order to achieve the core of the technical solution, a quantized value that is representative of the content complexity of the video to be transcoded is acquired first. As such, an analysis of a relationship among the complexity of a video image, a quantization parameter (QP) and an encoding bit number (i.e., a bit rate) is desired.

The complexity of the image corresponds to information of image details. The complexity the image is higher as the information of the details is more. For a same image, a number of encoding bits needed is larger as a selected quantization parameter (QP) is smaller. For different images, a number of encoding bits needed is larger as the complexity of an image is higher, given a same quantization parameter (QP). As can be seen, given a quantization parameter (QP), the number of encoding bits (i.e., a bit rate) may be representative of the complexity of a video image. The number of encoding bits is the quantized value representative of the content complexity of the video to be transcoded according to the present disclosure.

At S203, the maximum value of the quantization parameter QP_max when the PSNR is higher than or equal to 40 dB has been acquired. When the quantization parameter (QP) is less than or equal to QP_max, no distortion occurs in a transcoded video that is obtained, and each quantization parameter corresponds to a bit rate value. When the quantization parameter is equal to QP_max, a bit rate value corresponding thereto is a minimum. In other words, a minimum quantized value Br_min that is representative of the content complexity of the video to be transcoded and satisfies the preset objective quality standard according to the present disclosure is acquired. Under a circumstance that parameters such as a frame rate and a resolution are fixed, transcoding using the minimum value of the bit rate can guarantee that no distortion occurs in a target video file so generated on the one hand, and can occupy the network bandwidth minimally on the other hand.

In an implementation, the minimum value of the bit rate Br_min corresponding to the quantization parameter QP_max is acquired using the following approach: setting the quantization parameter value as QP_max with original video parameters (including a resolution, a frame rate, etc.) of the video to be transcoded being used, performing a transcoding operation using a transcoding tool provided by FFMPEG, and acquiring a bit rate value of a video outputted after the transcoding based on related information outputted in a screen, i.e., the minimum value of the bit rate Br_min corresponding to QP_max, based on which the transcoding parameter may be set at S102 subsequently.

It should be noted that the embodiment takes the minimum value of the bit rate, which corresponds to the maximum value of the quantization parameter and satisfies the preset objective quality standard, as the minimum quantized value representative of the content complexity of the video to be transcoded. In other implementations, other values may also be used as the minimum quantized value representative of the content complexity of the video to be transcoded, and transcoding parameters may be set up subsequently based thereon. The foregoing change in the implementations does not depart from the core of the present disclosure and also falls in the protection scope of the present disclosure.

Block S102 sets value(s) for transcoding parameter(s) based on the minimum quantized value representative of the content complexity of the video to be transcoded and a video parameter value of the video to be transcoded.

The transcoding parameters that need to set up for transcoding the video to be transcoded generally include: a bit rate parameter, a resolution parameter and a frame rate parameter. Since the minimum value of the bit rate Br_min representative of the content complexity of the video to be transcoded and satisfying the objective condition for video with distortion is acquired at S101, a value for the bit rate parameter in the transcoding parameters may be directly set as the minimum value of the bit rate, Br_min. Respective values for the resolution parameter and the frame rate parameter value in the transcoding parameter may be set as an acquired resolution value and a frame rate value of the video to be transcoded respectively at this method block. At S103, a transcoding operation is performed based on the transcoding parameters set up above, which can guarantee that no distortion occurs in a target video image and reduce the network bandwidth occupied as much as possible, under a condition that the frame rate and the resolution remain unchanged.

In an implementation, since function(s) provided by FFMPEG is/are used for transcoding, transcoding parameter variables in a data structure of AVCodecContext used by the function(s) are needed to be set at this method block. The acquired resolution value of the video to be transcoded is stored in Res_org, and the acquired frame rate value of the video to be transcoded is Fps_org. The codes for setting the transcoding parameters are shown as follows:

```
AVCodecContext *c;
c->bit_rate = Br_min;            // set a bit rate
c->width =Res_org.width;         // set a width of a resolution
c->height = Res_org.height;      // set a height of the resolution
c->time_base.den = Fps_org;      // set a denominator of a frame rate
c->time_base.num = 1;            // set a numerator of the frame rate
```

The code fragments listed above are merely used for illustrative purpose, and emphasize the setting of the parameters of the bit rate, the resolution and the frame rate in the transcoding parameters. In an implementation, other relevant parameters are also needed to be set up based on needs in order to transcode correctly. Such portion of content does not belong to the scope of the technical solution of the present disclosure, and thus is shown herein.

Figure 4:
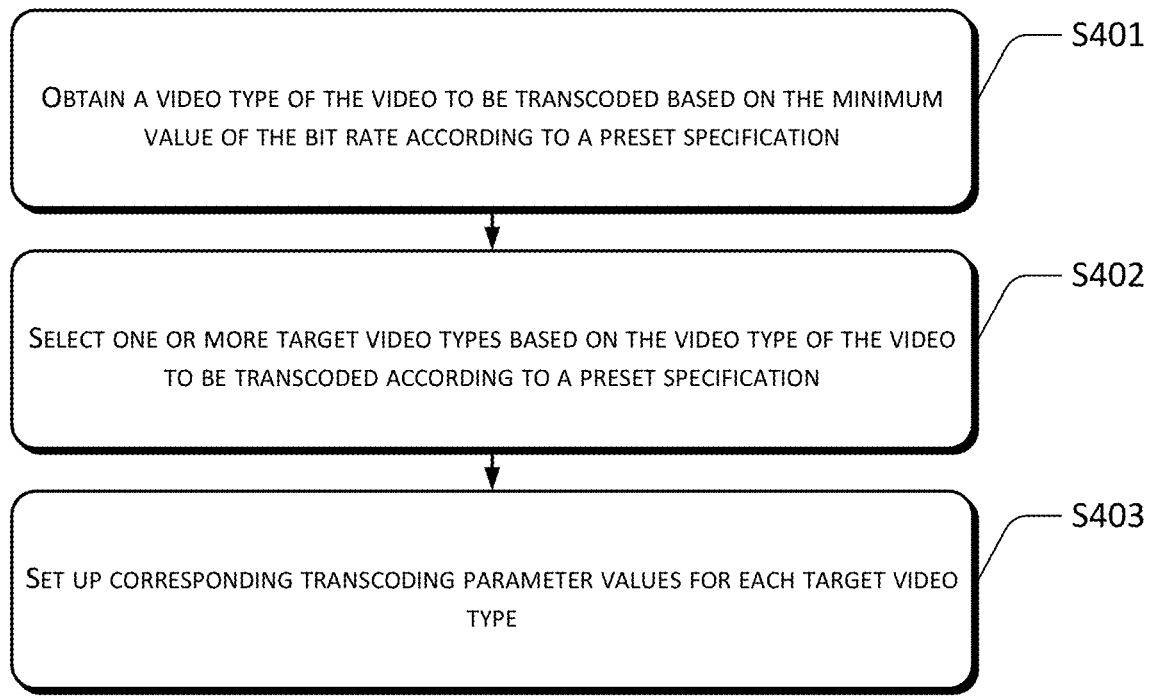
FIG. 4 is a flowchart of setting a transcoding parameter for generating a plurality of target videos according to the present disclosure.

By using the above setting mode, a target video having the same frame rate and resolution as the video to be transcoded and the bit rate as Br_min may be generated after the transcoding at S103. Taking into account of a real application, video enterprises often need to generate target videos with different resolutions based on a same video file to be transcoded, and provide users with different levels of video service sources. Thus, the technical solution of the present disclosure further provides a solution of setting transcoding parameters at different levels based on the minimum quantized value Br_min representative of the content complexity of the video to be transcoded, and thus generating a plurality of target videos at S103. The method sub-blocks involved in that process are described herein in details with reference to FIG. 4.

Block S401 obtains a video type (videoType) of the video to be transcoded based on the minimum value of the bit rate according to a preset specification.

The video type in the present disclosure includes: a LD bit stream, a SD bit stream, a HD bit stream, an UD bit stream, and an UUD bit stream, where LD, SD, HD, UD, and UUD are English abbreviations of a low definition, a standard definition, a high definition, an Ultra High Definition and an Ultra Ultra High Definition respectively, representing different definition levels from low to high. Due to different definitions, a bit rate scope and a resolution scope corresponding to each bit stream are also different.

This method block obtains a video type (videoType) of the video to be transcoded based on the acquired minimum value of the bit rate according to a preset specification. In an implementation, the video type of the video to be transcoded is acquired according to a specification as shown in Table 1.

TABLE 1

Specification for Bit Rate and Type

| Bit Stream Type | Maximum Value | Minimum Value | Intermediate Value |
|---|---|---|---|
| UUD Bit Stream | >2M | >2M | >2M |
| UD Bit Stream | 2M | 1.0M | 1.6M |
| HD Bit Stream | 1M | 500k | 900M |
| SD Bit Stream | 500k | 300K | 450K |
| LD Bit Stream | 300k | 0 | 250k |

Table 1 defines three types of bit rates, where a maximum value and a minimum value define a bit rate scope to which a video type belongs. For example, the bit rate scope corresponding to the UD bit stream ranges between a maximum value of 2 Mbps and a minimum value of 1 Mbps. If Br_min is located between 2 Mbps and 1 Mbps, a video type of the video to be transcoded is considered as the UD type.

In the above implementation, the specification of Table 1 is used to define a correspondence relationship between bit rates and video types. In other implementations, settings in the table may be adjusted based on experiment results or specific needs in an implementation. Alternatively, other approach may be used to determine the video type of the video to be transcoded.

In response to obtaining the video type of the video to be transcoded based on the minimum value of the bit rate, the video type may be modified based on the acquired resolution of the video to be transcoded. Specifically, a minimum value for the resolution corresponding to the video type of the video to be transcoded is obtained according to the preset specification. A determination is made as to whether the acquired resolution parameter value of the video to be transcoded is lower than the minimum value. If affirmative, a video type corresponding to the acquired resolution parameter value of the video to be transcoded is used as the video type of the video to be transcoded.

In an implementation, a specification in Table 2 is used for defining a correspondence relationship between video types and minimum resolution values:

TABLE 2

Specification for Resolution and Type

| Bit Stream Type | Minimum Value of Resolution |
| --- | --- |
| UUD Bit Stream | 1920 × 1080 |
| UD Bit Stream | 1440 × 1080 |
| HD Bit Stream | 1120 × 630 |
| SD Bit Stream | 736 × 414 |
| LD Bit Stream | 544 × 306 |

Generally, the resolution of the video to be transcoded is higher than the minimum resolution of the selected video type. Under certain circumstances, the resolution of the video to be transcoded is rather low. In this case, if a higher bit rate is used for video transcoding, additional network bandwidth resource will be occupied unnecessarily. Thus, the video type of the video to be transcoded may be descended, i.e., a video type corresponding to the acquired resolution parameter value of the video to be transcoded is used as the video type of the video to be transcoded.

For example, the video type of the video to be transcoded as acquired from Table 1 is a UD bit stream, and the minimum resolution corresponding to the UD bit stream is 1440×1080 as determined from Table 2. However, the resolution of the video to be transcoded is 1280×720, which is lower than the above minimum resolution value. In this case, the HD bit stream corresponding to 1280×720 is used as the video type of the video to be transcoded.

In the above implementation, a minimum resolution corresponding to a certain video type is acquired according to the specification given in Table 2. In other embodiments, the minimum resolution values in the table may be adjusted based on specific requirements. Alternatively, a minimum resolution value corresponding to a certain video type may be acquired using other approaches without using Table 2.

In the above implementation, the video type of the video to be transcoded is modified according to the specification in Table 2. In certain application scenarios having special requirements, a video source with a high bit rate may be allowed and needed to be generated for a lower resolution. In this case, the above modification operation may not be performed, and the video type of the video to be transcoded may be acquired directly based on the minimum value of the bit rate Br_min.

Block S402 selects one or more target video types genType based on the video type of the video to be transcoded according to a preset specification.

In order to provide a plurality of video sources of different levels, this method block selects one or more target video types based on the video type of the video to be transcoded. A specific selection strategy is to reduce a resolution of the target video based on the resolution of the video to be transcoded, and to generate video sources of different levels having a resolution equal to or lower than the resolution of the video to be transcoded, thereby offering a plurality of options to users.

In an implementation, a specification listed in Table 3 is used for determining a target video type. For example, if the video type (videoType) of the video to be transcoded is a UD type, selectable types (genType) of the target video include: an UD bit stream, a HD bit stream, a SD bit stream and a LD bit stream.

TABLE 3

Specification for Types of Video to be Transcoded and Generated Bit Stream

| Source Type (videoType) | Target Type (genType) | | | |
| --- | --- | --- | --- | --- |
| | UD Bit Stream | HD Bit Stream | SD Bit Stream | LD Bit Stream |
| UUD Type | ★ | ★ | ★ | ★ |
| UD Type | ★ | ★ | ★ | ★ |
| HD Type | | ★ | ★ | ★ |
| SD Type | | | ★ | ★ |
| LD Type | | | | ★ |

Block S403 sets up corresponding transcoding parameter values for each target video type.

For the one or more target video types that have been selected at S402, corresponding transcoding parameter values may be set for each target video type at this method block. In the technical solution of the present disclosure, the setting of the transcoding parameters mainly relates to the bit rate parameter and the resolution parameter (with the value of the frame rate parameter being directly taken as the frame rate value of the video to be transcoded). In order to find a suitable resolution with a constraint on a bit rate to achieve a suitable match between the bit rate and the resolution, the technical solution of the present disclosure builds a model for resolutions and bit rates of video to be transcoded, and thereby configures respective optimized parameters for a resolution and an encoding bit rate of each target video.

Figure 5:
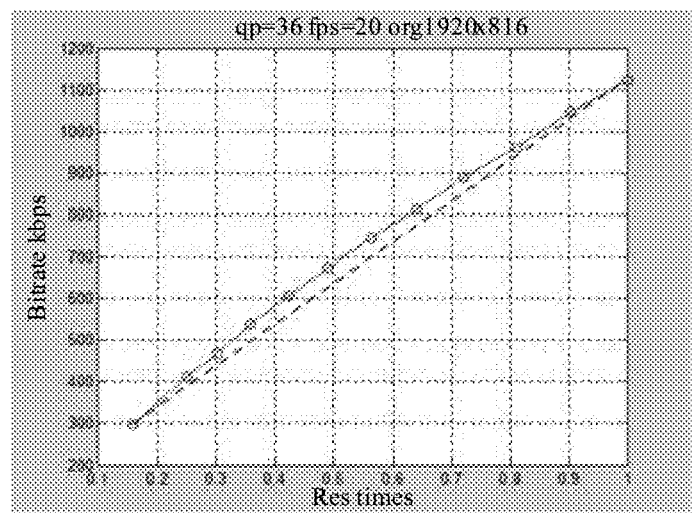
FIG. 5 is a schematic diagram of a resolution and a bit rate that satisfy a near-linear relationship acquired by experiments according to the present disclosure.

Since the resolution and the bit rate still have a near-linear relationship when video parameters such as the frame rate and the quantization parameter are fixed, a model thereof may be built with reference to FIG. 5, which is a schematic diagram illustrating a near-linear relationship between resolutions and bit rates acquired by experiments according to the present disclosure.

In an implementation, the minimum value of the bit rate Br_min that corresponds to the maximum value of the quantization parameter has been acquired under the condition of no objective video distortion at S101. Furthermore, the acquired resolution of the video to be transcoded is Res_org. Thus, two points (0, 0) and (Br_min, Res_org) may be used to generate the linear model, i.e., the model for resolutions and bit rates.

Upon building the model, values of transcoding parameters corresponding to a target video type may be configured for each target video type. In other words, according to a preset specification, an intermediate bit rate value between a maximum value and a minimum value of a bit rate corresponding to a current target video type is selected, and a value of a bit rate parameter in the transcoding parameters is set as the intermediate bit rate value. Based on the built linear model for the resolutions and the bit rates, a resolution value corresponding to the intermediate bit rate value is obtained, and a value of a resolution parameter in the transcoding parameters is set as the resolution value. A value of a frame rate parameter in the transcoding parameters is set as the acquired frame rate value of the video to be transcoded.

In an implementation, the target video types include three bit streams, i.e., HD, SD and LD bit streams. Firstly, for the HD bit stream, the specification defined in Table 1 is adopted. An intermediate bit rate value 900 Mbps corresponding to the HD bit stream is selected, and the bit rate parameter corresponding to the HD bit stream in the transcoding parameters is set as 900 Mbps. Based on the built model of the resolutions and the bit rates, a resolution of 1280×720, which corresponds to 900 Mbps, is acquired, and the resolution parameter corresponding to the HD bit stream in the transcoding parameters is set to be that value.

Based on the same processing method, corresponding transcoding parameters are configured for the target video types as SD and LD respectively. As the technical solution of the present disclosure does not involve an adjustment of the frame rate parameter, respective values of the frame rate parameter in the transcoding parameters corresponding to the above three target video types are set to be the acquired frame rate value (Fps_org) of the video to be transcoded. In an implementation, the setting mode for generating a target video as mentioned above may also be used, i.e., transcoding parameter variables in an AVCodecContext data structure used by the transcoding function are configured correspondingly, which is not redundantly described herein.

In an implementation, the above setting process may be further optimized. Since the model of the resolutions and the bit rates is a near-linear model and the relation therebetween is sometimes more close to a parabolic relation, this method block performs a weighting operation on the resolution value acquired by the model of the resolutions and the bit rates, for example, by multiplying a width and a height of the resolution value by a same preset adjustment factor 0.9 respectively, and uses the new resolution value to configure the resolution parameter in the transcoding parameters.

In an implementation, in order to guarantee the quality of the video generated after transcoding, the resolution value acquired by the model of the resolutions and the bit rates may be modified. Specifically, according to a preset specification, a minimum value of a resolution corresponding to a current target video type is obtained. A determination is made as to whether a resolution value corresponding to the intermediate bit rate value is lower than the minimum value of the resolution. If affirmative, the minimum value of the resolution is used as the resolution value for setting the resolution parameter in the transcoding parameters.

In an implementation, based on the specification defined in Table 2, the minimum value of the resolution corresponding to the current video type is acquired. This value generally indicates the worst condition that is set based on empirical values. Thus, the resolution value acquired based on the model of the resolutions and the bit rates ought to be higher than or equal to that minimum value. If less than the minimum value, the quality of the target video generally cannot be guaranteed. Thus, if less than the minimum value, the resolution value acquired based on the model of the resolutions and the bit rates may be discarded, and the minimum value of the resolution acquired according to the specification may be used for setting the corresponding transcoding parameter.

At this point, the process of setting the transcoding parameters is completed. As can be seen from the above description, the setting of the transcoding parameters at this method block is performed based on Br_min that is representative of the content complexity of the video to be transcoded under the circumstance of no objective video distortion. For a situation of generating a plurality of video sources, a video type of the video to be transcoded is also determined based on Br_min first, and a type of the target video is determined, followed by setting respective transcoding parameters for each target video type.

Block S103 transcodes the video to be transcoded based on the set transcoding parameters to generate a target video.

At this method block, the video to be transcoded is transcoded directly using the set bit rate parameter, the set resolution parameter and the set frame rate parameter to acquire a desired target video. In a case of generating a plurality of target videos, the video to be transcoded is transcoded using a respective set bit rate parameter, a respective set resolution parameter and a respective set frame rate parameter corresponding to a target video type for each target video type to acquire a plurality of target videos of different levels.

In an implementation, the transcoding parameter variables in the AVCodecContext data structure has been set correspondingly at S102. As such, the current method block is capable of directly calling an interface of the transcoding function provided by the FFMPEG library to perform transcoding.

In the method of content-based self-adaptive video transcoding provided by the present disclosure, transcoding parameters are configured based on a minimum quantized value Br_min that is representative of the content complexity of a video to be transcoded when a preset objective quality standard is satisfied. In other words, an amount of information of the video to be transcoded is taken into consideration when configuring the transcoding parameters. Furthermore, for different target video types, a resolution parameter that is more reasonably matched with a transcoding bit rate is configured for each target video type by building a model between resolutions and bit rates. As such, this not only ensures the quality of a target video generated after transcoding to provide better video display effects to users, but also avoids the unnecessary bandwidth consumption.

An evaluation result for the method of content-based self-adaptive transcoding provided by the present disclosure is provided as follows. For original videos in Table 4, parameters of video files generated using the method of content-based self-adaptive video transcoding provided in the present disclosure are shown in Table 5. Parameters of video files generated by an online system of the existing technologies are shown in Table 6.

TABLE 4

Original Video Information

| Video Name | Resolution | File Name | Yuv(Up1280 × 720) | BitRate |
|---|---|---|---|---|
| handu | 1280 × 720 | Handu_org.flv | Handu_org.yuv | |
| Lion | 1280 × 720 | lion_org.flv | lion_org.yuv | |
| Yzs | 1280 × 720 | Yzs_org.flv | Yzs_org.yuv | |

TABLE 5

SD Video Parameters Generated Using the Method of the Present disclosure

| Video Name | Resolution | File Name | Yuv(Up1280 × 72) | Bit Rate |
|---|---|---|---|---|
| handu | 736 × 412 | Handu_sd.flv | Handu_sd.yuv | 500k |
| lion | 1164 × 654 | Lion_sd.flv | Lion_sd.yuv | 460k |
| yzs | 1060 × 596 | Yzs_sd.flv | Yzs_sd.yuv | 432k |

TABLE 6

SD Video Parameters Generated Using Online System

| Video Name | Resolution | File Name | Yuv(Up1280 × 720) | Bit Rate |
|---|---|---|---|---|
| handu | 640 × 360 | Handu_hd_online.flv | Handu_hd_online.yuv | 600k |
| Lion | 640 × 360 | lion_hd_online.flv | lion_hd_online.yuv | 600k |
| Yzs | 640 × 360 | Yzs_hd_online.flv | Yzs_hd_online.yuv | 600k |

As can be seen from the above evaluation data, the video handu may be encoded to generate an SD video having a frame rate of 25 and a resolution of 736×412 for a bit rate of 500K by the method of content-based self-adaptive transcoding provided in the present disclosure. The resolution is 1.3 times and the bit rate is 9/10 as compared to the online system. However, the two videos have equivalent quality from the subjective perspective.

The video lion may be encoded to generate an SD video having a frame rate of 25 and a resolution of 1164×654 for a bit rate of 440K by the method of content-based self-adaptive transcoding provided in the present disclosure. The resolution is 2.35 times and the bit rate is 3/4 as compared to the online system. Overall, the video image generated by the method of the present disclosure is better in quality.

The video yzs may be encoded to generate an SD video having a frame rate of 25 and a resolution of 1060×596 for a bit rate of 432 k by the method of content-based self-adaptive transcoding provided in the present disclosure. The resolution is 2.75 times and the bit rate is 3/4 as compared to the online system. Overall, the video image generated by the method of the present disclosure is better in quality.

Figure 6:
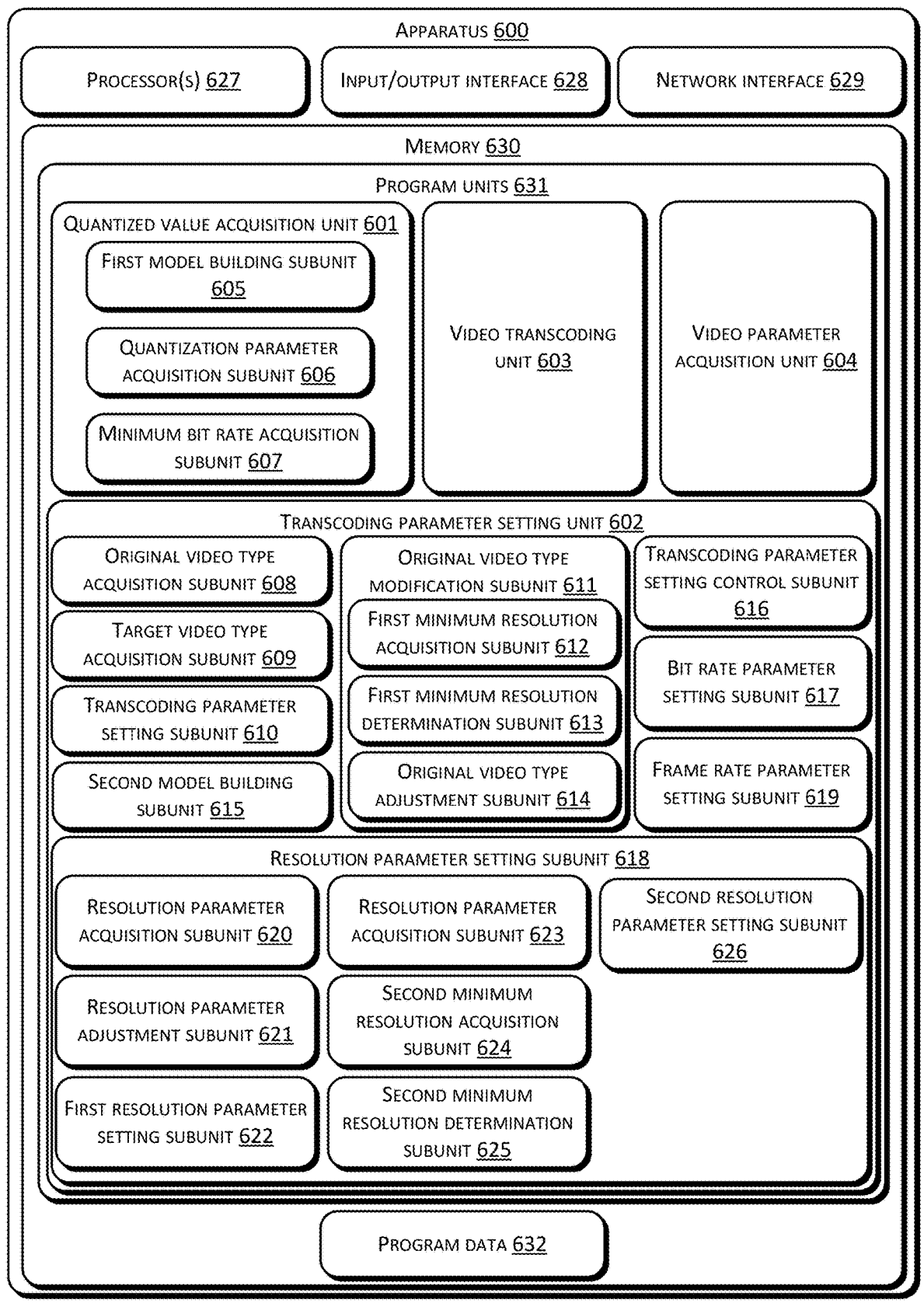
FIG. 6 is a schematic diagram of an example apparatus of content-based self-adaptive video transcoding according to the present disclosure.

In the foregoing embodiments, the present disclosure provides a method of content-based self-adaptive video transcoding. Correspondingly, the present disclosure further provides an apparatus of content-based self-adaptive video transcoding. FIG. 6 shows a schematic diagram of an example apparatus 600 of content-based self-adaptive video transcoding according to the present disclosure. Since the apparatus embodiments are substantially similar to the method embodiments, a description thereof is relatively simple. Related parts may be acquired with reference to corresponding portions in the method embodiments. Thus, the apparatus embodiments described herein are merely illustrative.

The example apparatus 600 of content-based self-adaptive video transcoding includes: a quantized value acquisition unit 601 to acquire a minimum quantized value that is representative of a content complexity of a video to be transcoded and satisfies a preset objective quality standard; a transcoding parameter setting unit 602 to configure value(s) of transcoding parameter(s) based on the minimum quantized value representative of the content complexity of the video to be transcoded and value(s) of video parameter(s) of the video to be transcoded; and a video transcoding unit 603 to transcode the video to be transcoded based on the configured transcoding parameter(s) to generate a target video.

Optionally, the transcoding parameter(s) configured by the transcoding parameter setting unit includes: a bit rate parameter, a resolution parameter and a frame rate parameter.

Optionally, the apparatus 600 further includes:
a video parameter acquisition unit 604 to acquire the value(s) of the video parameter(s) of the video to be transcoded prior to acquiring the minimum quantized value that is representative of the content complexity of the video to be transcoded and satisfies the preset objective quality standard, the video parameter(s) including a resolution parameter and a frame rate parameter.

Optionally, when the quantized value acquisition unit 601 acquires the minimum quantized value, the satisfied preset objective quality standard corresponds to a peak signal-to-noise ratio (PSNR) being higher than or equal to 40 dB.

Optionally, the quantized value acquisition unit 601 includes:
a first model building subunit 605 to build a linear model of a quantization parameter (QP) and a peak signal-to-noise ratio (PSNR) for the video to be transcoded;
a quantization parameter acquisition subunit 606 to acquire a maximum value of the quantization parameter (QP) when the peak signal-to-noise ratio (PSNR) is higher than or equal to 40 dB based on the linear model;
a minimum bit rate acquisition subunit 607 to transcode the video to be transcoded based on the maximum value of the quantization parameter (QP), and acquire a minimum value of a bit rate corresponding to the maximum value of the quantization parameter (QP), the minimum value of the bit rate being the minimum quantized value that is representative of the content complexity of the video to be transcoded and satisfies the preset objective quality standard.

Optionally, the first model building subunit 605 is used to truncate one or more video clips in the video to be transcoded, and build the linear model of the quantization parameter (QP) and the peak signal-to-noise ratio (PSNR) based on the one or more video clips.

Optionally, the transcoding parameter setting unit 602 is used to set a value of a bit rate parameter in the transcoding parameter(s) as the minimum value of the bit rate, set a value of a resolution parameter in the transcoding parameter(s) as an acquired resolution value of the video to be transcoded, and set a value of a frame rate parameter in the transcoding parameter(s) as an acquired frame rate value of the video to be transcoded.

Optionally, the transcoding parameter setting unit 602 includes:
an original video type acquisition subunit 608 to acquire a video type of the video to be transcoded based on the minimum value of the bit rate according to a preset specification;
a target video type acquisition subunit 609 to select one or more target video types based on the video type of the video to be transcoded according to the preset specification; and a transcoding parameter setting subunit 610 to set corresponding transcoding parameter value(s) for each target video type.

Optionally, video types processed by the original video type acquisition subunit and the target video type acquisition subunit include: a LD bit stream, a SD bit stream, a HD bit stream, an UD bit stream, or an UUD bit stream.

Optionally, the transcoding parameter setting unit 602 further includes:

an original video type modification subunit 611 to modify the video type of the video to be transcoded after the video type of the video to be transcoded is acquired based on the minimum value of the bit rate.

The original video type modification subunit 611 includes:

a first minimum resolution acquisition subunit 612 to acquire a minimum value of a resolution corresponding to the video type of the video to be transcoded according to a preset specification;

a first minimum resolution determination subunit 613 to determine whether an acquired resolution parameter value of the video to be transcoded is less than the minimum value; and an original video type adjustment subunit 614 to use a video type corresponding to the acquired resolution parameter value of the video to be transcoded as the video type of the video to be transcoded in response to an output of the first minimum resolution judgment subunit being affirmative.

Optionally, the transcoding parameter setting subunit 602 includes:

a second model building subunit 615 to build a linear model of resolutions and bit rates for the video to be transcoded based on the minimum value of the bit rate and the acquired resolution parameter value of the video to be transcoded; and a transcoding parameter setting control subunit 616 to set transcoding parameter(s) for each target video type by invoking a bit rate parameter setting subunit 617, a resolution parameter setting subunit 618 and a frame rate parameter setting subunit 619 sequentially;

the bit rate parameter setting subunit 617 to select an intermediate bit rate value between a maximum value and a minimum value of the bit rate corresponding to a current target video type according to a preset specification, and set a value of a bit rate parameter in the transcoding parameter(s) as the intermediate bit rate value;

the resolution parameter setting subunit 618 to acquire a resolution value corresponding to the intermediate bit rate value based on the built linear model of the resolutions and the bit rates, and set a value of a resolution parameter in the transcoding parameter(s) as the resolution value; and the frame rate parameter setting subunit 619 to set a value of a frame rate parameter in the transcoding parameter(s) as an acquired frame rate value of the video to be transcoded.

Optionally, the resolution parameter setting subunit 618 includes:

a resolution parameter acquisition subunit 620 to acquire a resolution value corresponding to the intermediate bit rate value based on the built linear model of the resolutions and the bit rates;

a resolution parameter adjustment subunit 621 to multiply a width and a height of the resolution value that is outputted by the resolution parameter acquisition subunit by a same preset adjustment factor respectively; and a first resolution parameter setting subunit 622 to set a value of a resolution parameter in the transcoding parameter(s) as the adjusted resolution value outputted by the resolution parameter adjustment subunit.

Optionally, the resolution parameter setting subunit 618 includes:

a resolution parameter acquisition subunit 623 to acquire a resolution value corresponding to the intermediate bit rate value based on the built linear model of the resolutions and the bit rates;

a second minimum resolution acquisition subunit 624 to acquire a minimum value of a resolution corresponding to a current target video type according to a preset specification;

a second minimum resolution determination subunit 625 to determine whether the resolution value corresponding to the intermediate bit rate value is less than the minimum value of the resolution; and a second resolution parameter setting subunit 626 to set a value of a resolution parameter in the transcoding parameter(s) as the minimum value of the resolution in response to an output of the second minimum resolution judgment subunit being affirmative.

Optionally, the video transcoding unit 603 is used to transcode the video to be transcoded to acquire a corresponding target video using a respective bit rate parameter, a respective resolution parameter and a respective frame rate parameter that are set corresponding to a target video type for each target video type.

Although the present disclosure has been described using the exemplary embodiments, they are not intended as limitations to the present disclosure. One skilled in the art can make possible changes and modifications without departing from the spirit and scope of the present disclosure. Therefore, the protection scope of the present disclosure is to be defined by the claims of the present disclosure.

In a typical configuration, the apparatus 600 may be implemented as one or more computing devices. In an embodiment, the apparatus 600 may include one or more central processing units (CPUs) 627, an input/output interface 628, a network interface 629 and memory 630.

The memory 630 may include a form of a computer readable media such as a volatile memory, a Random Access Memory (RAM), and/or non-volatile memory, e.g., Read-Only Memory (ROM) or flash RAM, etc. The memory is an example of a computer readable media.

The computer readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 630 may include program units 631 and program data 632. The memory 630, e.g., program units 631, may include one or more units and/or sub-units as described in the foregoing description. Details of these units and sub-units may be found in the foregoing description and are therefore not redundantly described herein.

One skilled in the art should understand that the embodiments of the present disclosure may be provided as a method, a system or a computer program product. Therefore, the present disclosure may be implemented as a completely hardware embodiment, a completely software embodiment, or an embodiment which is a combination of software and hardware. Moreover, the present disclosure may be in a form of a computer program product implemented in one or more computer usable storage media (including, but not limited to, a magnetic disk storage device, a CD-ROM, an optical storage device, etc.) including computer usable program codes.

What is claimed is:

1. A method implemented by one or more computing devices, the method comprising:
    acquiring a minimum quantized value based on original video parameters of a video to be transcoded, the minimum quantized value being representative of a content complexity of the video and satisfying a preset objective quality standard based on a linear model of a quantization parameter (QP) and a peak signal-to-noise ratio (PSNR) obtained from the linear model for the video;
    configuring one or more values of one or more transcoding parameters based at least in part on the minimum quantized value representative of the content complexity of the video and one or more values of one or more video parameters of the video by:
        acquiring a video type of the video based at least in part on a minimum value of a bit rate according to a preset specification,
        selecting one or more target video types based at least in part on the video type of the video according to the preset specification, and
        setting corresponding transcoding parameter values for each target video type including selecting an intermediate bit rate value between a respective maximum value and a respective minimum value of the bit rate corresponding to a current target video type, and setting a value of a bit rate parameter in the corresponding transcoding parameters as the intermediate bit rate value; and
    transcoding the video based on the one or more configured transcoding parameters to generate a target video.

2. The method of claim 1, wherein the one or more transcoding parameters comprises one or more of the bit rate parameter, a resolution parameter and a frame rate parameter.

3. The method of claim 1, wherein: prior to acquiring the minimum quantized value that is representative of the content complexity of the and satisfies the preset objective quality standard, the method further comprises obtaining the one or more values of the one or more video parameters of the video, the one or more video parameters comprising one or more of a resolution parameter and a frame rate parameter.

4. The method of claim 1, wherein the preset objective quality standard comprises the PSNR being higher than or equal to 40 dB.

5. The method of claim 1, wherein acquiring the minimum quantized value comprises:
    acquiring a maximum value of the QP when the PSNR is higher than or equal to 40 dB based at least in part on the linear model;
    transcoding the video based on the maximum value of the QP; and
    acquiring a minimum value of a bit rate corresponding to the maximum value of the QP, the minimum value of the bit rate being the minimum quantized value that is representative of the content complexity of the video and satisfies the preset objective quality standard.

6. The method of claim 5, wherein building the linear model comprises truncating one or more video clips from the video, and building the linear model of the QP and the PSNR based at least in part on the one or more video clips.

7. The method of claim 5, wherein configuring the one or more values of the one or more transcoding parameters comprises:
    setting a value of a bit rate parameter in the one or more transcoding parameters as the minimum value of the bit rate;
    setting a value of a resolution parameter in the one or more transcoding parameters as an acquired resolution value of the video; and
    setting a value of a frame rate parameter in the one or more transcoding parameters as an acquired frame rate value of the video.

8. The method of claim 1, wherein the video type of the video comprises: a LD bit stream, a SD bit stream, a HD bit stream, an UD bit stream or an UUD bit stream.

9. The method of claim 1, further comprising modifying the video type of the video after acquiring the video type of the video, the modifying comprising:
    acquiring a minimum value of a resolution corresponding to the video type of the video to be transcoded according to a preset specification;
    determining whether an acquired resolution parameter value of the video is less than the minimum value of the resolution; and
    using a video type corresponding to the acquired resolution parameter value of the video as the video type of the video in response to determining that the acquired resolution parameter value of the video is less than the minimum value of the resolution.

10. The method of claim 1, wherein setting the corresponding transcoding parameter values for each target video type comprises:
    building a linear model of resolutions and bit rates for the video based at least in part on the minimum value of the bit rate and an acquired resolution parameter value of the video;
    for each target video type:
    acquiring a resolution value corresponding to the intermediate bit rate value based on the built linear model of the resolutions and the bit rates, and setting a value of a resolution parameter in the corresponding transcoding parameters as the resolution value; and
    setting a value of a frame rate parameter in the corresponding transcoding parameters as an acquired frame rate value of the video.

11. The method of claim 10, further comprising adjusting the acquired resolution value by multiplying a width and a height of the acquired resolution value by a same preset adjustment factor respectively, and using the adjusted resolution value as the resolution value used for setting the resolution parameter in the corresponding transcoding parameters after acquiring the resolution value corresponding to the intermediate bit rate value.

12. The method of claim 10, wherein setting the transcoding parameter values for each target video type further comprises:

acquiring a minimum value of a resolution corresponding to the current target video type;

determining whether the acquired resolution value corresponding to the intermediate bit rate value is less than the minimum value of the resolution; and using the minimum value of the resolution as the resolution value used for setting the resolution parameter in the corresponding transcoding parameters in response to determining that the acquired resolution value corresponding to the intermediate bit rate value is less than the minimum value of the resolution.

13. The method of claim 10, wherein transcoding the video comprises using the bit rate parameter, the resolution parameter and the frame rate parameter that are set corresponding to the target video type to transcode the video.

14. An apparatus comprising:
one or more processors;
memory coupled to the one or more processors, the memory storing a plurality of program units executable by the one or more processors, the plurality of program units including;
a quantized value acquisition unit configured to acquire a minimum quantized value based on original video parameters of a video to be transcoded, the minimum quantized value being representative of a content complexity of the video and satisfying a preset objective quality standard based on a linear model of a quantization parameter (QP) and a peak signal-to-noise ratio (PSNR) obtained from the linear model for the video;
a transcoding parameter setting unit configured to set one or more values of one or more transcoding parameters based at least in part on the minimum quantized value representative of the content complexity of the video and one or more values of one or more video parameters of the video by:
acquiring a video type of the video based at least in part on a minimum value of a bit rate according to a preset specification,
selecting one or more target video types based at least in part on the video type of the video according to the preset specification,
setting corresponding transcoding parameter values for each target video type including selecting an intermediate bit rate value between a respective maximum value and a respective minimum value of the bit rate corresponding to a current target video type, and setting a value of a bit rate parameter in the corresponding transcoding parameters as the intermediate bit rate value; and
a video transcoding unit configured to transcode the video based at least in part on the one or more set transcoding parameters to generate a target video.

15. The apparatus of claim 14, wherein the plurality of program units further includes a video parameter acquisition unit configured to acquire the one or more values of the one or more video parameters of the video before acquiring the minimum quantized value, the one or more video parameters comprising one or more of a resolution parameter and a frame rate parameter.

16. The apparatus of claim 15, wherein the quantized value acquisition unit comprises:
a first model building subunit configured to build the linear model;
a quantization parameter acquisition subunit configured to acquire a maximum value of the QP when the PSNR is higher than or equal to 40 dB based at least in part on the linear model; and a minimum bit rate acquisition subunit configured to transcode the video based on the maximum value of the quantization parameter, and to acquire a minimum value of a bit rate corresponding to the maximum value of the quantization parameter, the minimum value of the bit rate being the minimum quantized value representative of the content complexity of the video and satisfying the preset objective quality standard.

17. The apparatus of claim 16, wherein the first model building subunit is further configured to truncate one or more video clips in the video, and builds the linear model of the QP and the PSNR based at least in part on the one or more video clips.

18. The apparatus of claim 16, wherein the transcoding parameter setting unit is further configured to set a value of a bit rate parameter in the one or more transcoding parameters as the minimum value of the bit rate, set a value of a resolution parameter in the one or more transcoding parameters as an acquired resolution value of the video, and set a value of a frame rate parameter in the one or more transcoding parameters as an acquired frame rate value of the video.

19. One or more computer-readable media storing executable instructions that, when executed by one or more processors, cause the one or more processors to perform acts comprising:
acquiring a minimum quantized value based on original video parameters of a video to be transcoded, the minimum quantized value being representative of a content complexity of a video and satisfying a preset objective quality standard based on a linear model of a quantization parameter and a peak signal-to-noise ratio obtained from the linear model for the video;
configuring one or more values of one or more transcoding parameters based at least in part on the minimum quantized value representative of the content complexity of the video and one or more values of one or more video parameters of the video by:
acquiring a video type of the video based at least in part on a minimum value of a bit rate according to a preset specification,
selecting one or more target video types based at least in part on the video type of the video according to the preset specification, and
setting corresponding transcoding parameter values for each target video type including selecting an intermediate bit rate value between a respective maximum value and a respective minimum value of the bit rate corresponding to a current target video type, and setting a value of a bit rate parameter in the corresponding transcoding parameters as the intermediate bit rate value; and
transcoding the video based on the one or more configured transcoding parameters to generate a target video.

20. The one or more computer-readable media of claim 19, wherein acquiring the minimum quantized value comprises:
acquiring a maximum value of the QP when the PSNR is higher than or equal to 40 dB based at least in part on the linear model;
transcoding the video based on the maximum value of the QP; and
acquiring a minimum value of a bit rate corresponding to the maximum value of the QP, the minimum value of the bit rate being the minimum quantized value that is representative of the content complexity of the video and satisfies the preset objective quality standard.

* * * * *